United States Patent [19]

Malewicki et al.

[11] Patent Number: 5,052,680
[45] Date of Patent: Oct. 1, 1991

[54] TRAILERABLE ROBOT FOR CRUSHING VEHICLES

[75] Inventors: Douglas J. Malewicki, Irvine; Philip C. Emmons, Anaheim; Robert M. Kubinski, Garden Grove, all of Calif.; Douglas D. Schumann, Southington, Conn.

[73] Assignee: Monster Robot, Inc., Malibu, Calif.

[21] Appl. No.: 477,042

[22] Filed: Feb. 7, 1990

[51] Int. Cl.⁵ .............................................. A63G 31/00
[52] U.S. Cl. ..................................... 272/1 R; 446/376; 446/465; 280/1.16; 100/233
[58] Field of Search ................... 272/1 R; 446/93-95, 446/97, 99, 102, 104, 268, 269, 289-291, 376, 431, 465, 470, 487; 280/1.1; 100/233

[56] References Cited

U.S. PATENT DOCUMENTS

| | | | |
|---|---|---|---|
| 3,085,516 | 4/1963 | Cirami | 272/34 X |
| 3,093,372 | 6/1963 | Cirami | 272/34 |
| 4,170,840 | 10/1979 | Ogawa . | |
| 4,307,891 | 12/1981 | Doornick et al. . | |
| 4,411,097 | 10/1983 | Murakami | 446/376 |
| 4,516,948 | 5/1985 | Obara . | |
| 4,573,944 | 3/1986 | Crow et al. | 446/465 |
| 4,586,911 | 5/1986 | Murakami | 446/376 |
| 4,594,071 | 6/1986 | Zaruba et al. . | |
| 4,599,078 | 7/1986 | Obara . | |
| 4,623,317 | 11/1986 | Nagano . | |
| 4,682,969 | 7/1987 | Choy et al. | 446/376 |
| 4,697,509 | 10/1987 | Labounty . | |

Primary Examiner—Richard E. Chilcot, Jr.
Attorney, Agent, or Firm—James Bartholomew

[57] ABSTRACT

A mechanical robot having hydraulically operated arms, mandible claws, neck, head and jaw, resembles a giant prehistoric reptile. It is driven from an on-board cockpit and is capable of picking up an automobile and crushing it, then biting into it with large teeth located within a powerful jaw. Various audible and visual effects are produced during operation thereby generating a frightful spectacle for exhibition, promotion and entertainment. The robot is capable of folding into a rigid structure and being attached to a trailer tractor for road hauling on its own wheels.

19 Claims, 11 Drawing Sheets

FIG. 8
ELECTRICAL SYSTEM

FIG. 9
HYDRAULIC SYSTEM

PNEUMATIC SYSTEM
FIG. 10

FIG. 11
PROPANE SYSTEM

TRAILERABLE ROBOT FOR CRUSHING VEHICLES

BACKGROUND OF THE INVENTION

The present invention relates generally to animated robotic figures for staged exhibitions and more particularly to a large-scale, highly articulated and animated robotic action figure suggestive of a giant reptile, capable of lifting and crushing automobiles or other heavy objects and which is easily and quickly converted to a road-trailerable configuration.

DESCRIPTION OF THE PRIOR ART

Robotic technology has found increasing application in the fields of entertainment, promotion and advertising whereby animated figures of various types are used to generate special effects generating viewer interest and attention. Typical applications of this technology on a larger scale are on floats in parades and in cinematic special effects such as the well known King Kong's arm. On a smaller scale robotic figures are frequently used for public amusement and as promotional aids in trade shows. Robot animated figures are typically driven by hydraulic, pneumatic and electromechanical actuators and motors controlled by analog or digital computers as well as by human operators.

The folding or transformation of an animated figure into a vehicle or other unit is taught in the field of transformer toys exemplified by U.S. Pat. No. 4,623,317 to Nagano, U.S. Pat. No. 4,586,911 to Murakami, U.S. Pat. No. 4,599,078 to Obara, U.S. Pat. No. 4,594,071 to Zaruba et al., U.S. Pat. No. 4,516,948 to Obara and U.S. Pat. No. 4,170,840 to Ogawa. This body of prior art teaches concepts and methods of folding and unfolding the separate parts of animated figures to form shapes representative of automobiles, trucks or other hardware or machines.

Another field of art pertinent to the present invention is that which teaches the crushing of automobiles and related objects. Specific details are taught in U.S. Pat. No. 4,442,766 to Hawkins, U.S. Pat. No. 4,697,509 to LaBounty and U.S. Pat. No. 3,752,064 to Suzuki. This body of art is of interest relative to the teachings of machine components and systems effectively used for crushing large objects.

There are relatively few sizable, free moving, robotic, animated figures used for entertainment. U.S. Pat. No. 4,307,891 to Doornick et al. teaches a robot capable of holding a platform for carrying a human rider. U.S. Pat. Nos. 3,507,222 and 3,093,372, both to Cirami teach robot figures used as amusement rides.

None of the prior art disclosures show the combination of features and capabilities of the instant invention. It is the applicants opinion that the combination of a massively sized robotic animated figure capable of lifting and crushing an automobile and which is controlled by on-board servosystems is quite unique in the art. The fact that the invention is road-trailerable for ease in moving to and from exhibition is of significant practical value. The invention has great potential in the fields of entertainment and spectacle, advertising and promotion.

SUMMARY OF THE INVENTION

One embodiment of the invention consists of a 40 foot tall machine having the appearance of an animated mechanical robot yet of such size and shape as to be representative of a prehistoric reptile such as the tyrannosaur or other large reptile of similar body conformation. The main superstructure consisting of a body, neck, arms and head sits atop two forward legs and a tail assembly. Arms, neck, head and body are movable to represent the possible actions of a beast. The legs are motor driven to provide propulsion for the robot relative to the ground whereby the tail provides support while functioning as a wheeled caster following behind the main superstructure. The upper body superstructure when lowered and folded forms a trailerable vehicle which may be pulled by a conventional trailer tractor. Setup capability from trailerable form to operating form and the reverse, is completely self contained allowing independent operation without external lifting or manipulation equipment.

During exhibition, the robot, assuming operating form, is controlled by a driver-operator located in a control booth cockpit within the head structure. Alternately, the robot may be controlled from the tail or remotely from a portable wireless field control unit. Animation features include the raising or lowering of the body, arms, head and jaw as well as forward movement with left and right steering. A major feature of the animation is the rotation of each claw-like hand and the opening, closing, raising or lowering of each claw. Various built-in sound and visual effects such as fire from nostrils and smoke projected from the mouth, light beams projected from the head, sub-woofer sounds issuing from the chest area and miscellaneous other special effects are all part of a wide range of animation features utilized for exhibition spectacle.

The robot is specifically designed to grasp an automobile or similar heavy object within its claws and to lift the automobile up to the jaw and bite it with the jaw as well as burn it with the projected fire. Therefore the robot is built primarily of high strength steel parts driven by high force hydraulic pistons.

In order to transport the robot between exhibitions it is set into trailerable form by moving the head, neck and body into line with the tail so that the entire robot forms a mainly horizontal in-line structure. The underside of the jaw, having a fifth wheel pin, mates to, and rest upon, a fifth wheel plate attached to the tractor and both the arms with claws and the legs, are raised above the ground for road clearance. In this position, attached to the tractor, the robot is pulled on the road with the tail supporting the rear end.

The invention provides a large, self propelled, robot capable of lifting and crushing automobiles or other large objects.

Advantageously, the invention provides a reconfigurable robot that is road trailerable within legal trailer size and weight restrictions, without the need to carry it upon a flatbed truck.

Moreover, the invention provides a large, self propelled, robot capable of generating a wide array of audio and visual effects designed to present a frightening spectacle.

Finally, the invention provides a large, self propelled, robot giving the appearance of a mechanical version of a prehistoric creature in order to produce a frightening spectacle.

These, together with other advantages and features of the invention which will become apparent as the following description proceeds, are attained by this trailerable robot for crushing vehicles, preferred embodiments thereof being shown in the accompanying drawings, by way of example only.

DESCRIPTION OF THE PREFERRED EMBODIMENT

Figure 1:
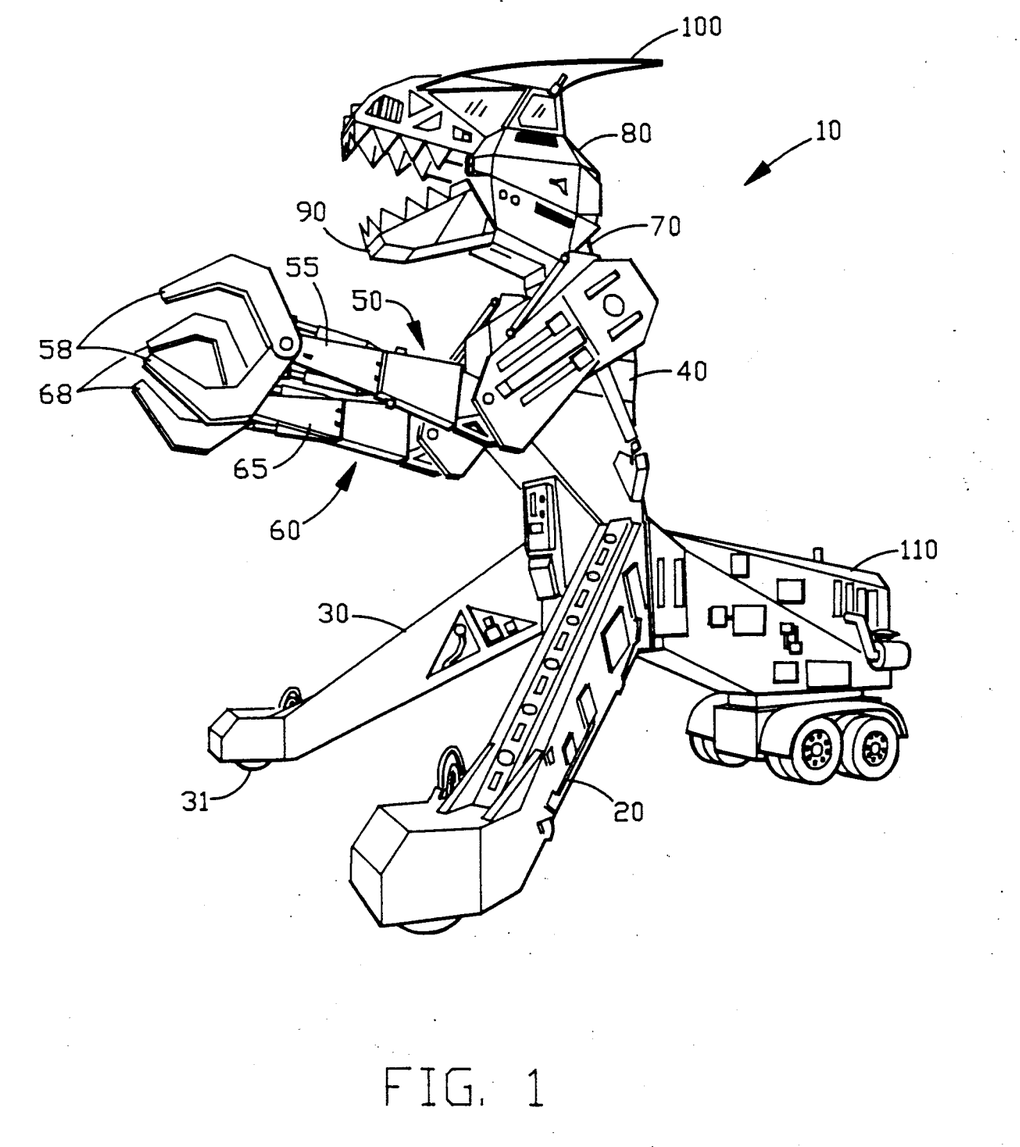
FIG. 1 is a perspective drawing of the invention in operating mode.
Figure 2:
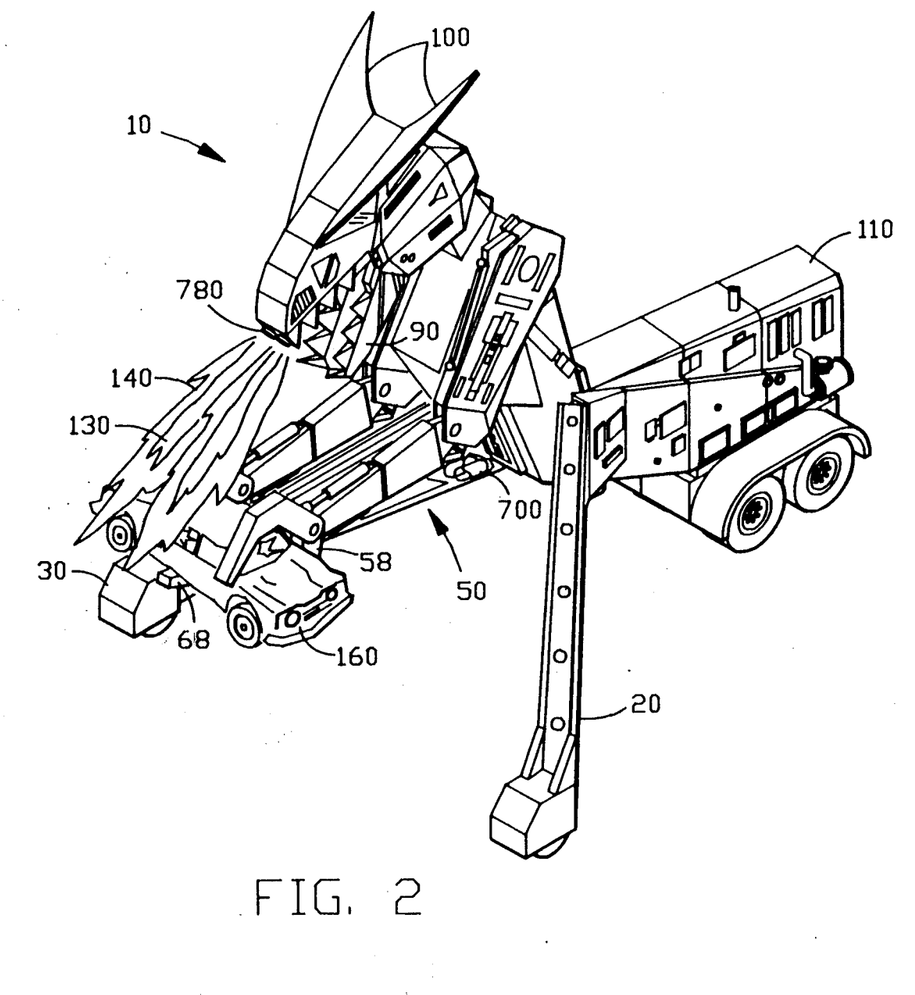
FIG. 2 is a perspective drawing of the invention in operating mode.

With reference to FIGS. 1 through 6, there is shown a robot 10, a mechanical animated figure, constructed of heavy duty steel structural members 15. Body 40 is pivotally mounted upon tail 110 and supported therefrom by legs 20 and 30. Arms 50, 60 and neck 70 are pivotally supported from the body 40. The arms 50, 60 comprise upper arms 53, 63, wrists and forearms 55, 65 and claws 58, 68. A head 80 pivotally supports a jaw 90 and is, in turn, pivotally supported upon the neck 70. Two ears 100 are pivotally supported upon the head 80. FIG. 2 shows locations of fire 130 produced by flame generating means 780 and smoke 140 produced by a smoke generator 430 (FIG.). Propane storage tanks 700 are mounted inside of the right leg 30.

Figure 3:
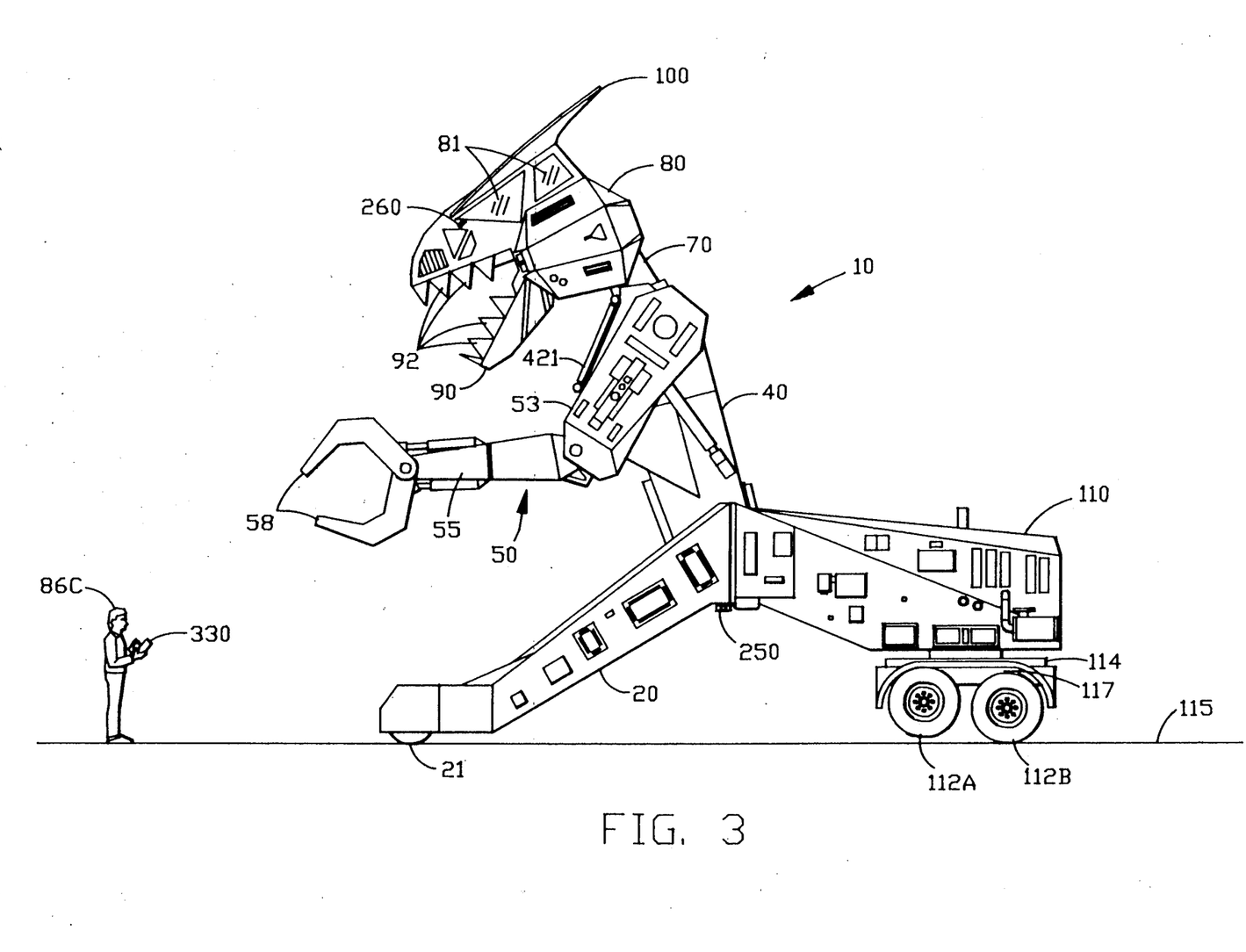
FIG. 3 is a side view of the invention in the operating mode.

With reference to FIG. 3, the robot 10 is shown in the operating mode, that is with the body 40 erect. The tail 110 is pivotally mounted upon a trailer chassis 114 which is free to rotate as a caster while rolling upon rear trailer wheels 112B. Forward trailer wheels 112A are raised above an underlying road surface 115 by deflated air suspension bags 117. The left leg 20 is supported upon left drive wheels 21. The left Arm 50 is comprised of the left upper arm 53, the left wrist and forearm 55 and the left claw 58. The left and right arms 50, 60 and the legs 20, 30 are, with respect to structure, mirror images respectively. The head 80 and the jaw 90 supports teeth 92 which mesh when said jaw 90 is in the closed position. Windows 81 and ultrasonic sensors 260 are mounted on both the left and the right sides of the head 80. An infrared receiver 250 is mounted on the forward underside of the tail 110. A remote control 330, an infrared transmission device is held by remote operator 86C. Skin lights 421 are mounted upon the body 40.

Figure 4:
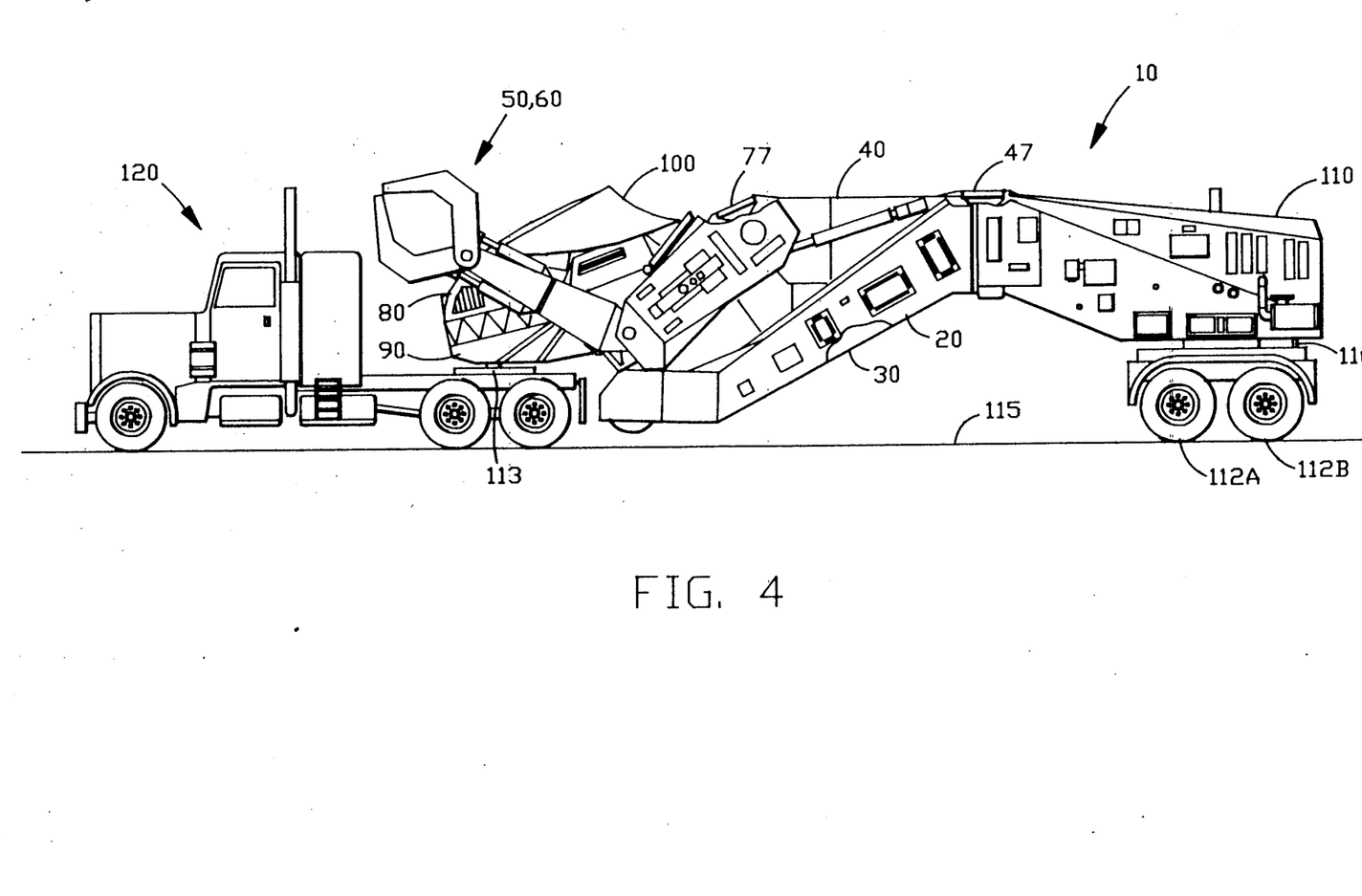
FIG. 4 is a side view of the invention in the trailering mode.

With reference to FIG. 4, there is shown robot 10 in trailering mode with head 80 and jaw 90 pivotally mounted upon fifth wheel 113 of tractor 120. Legs 20, 30 are drawn in against body 40 and locked in that position; see also FIG. 7B. Neck and hip compression struts 77, 47 are in the down and locked position forcing robot 10 into a rigid, somewhat hunched shape thereby raising legs 20, 30 above road surface 115. Arms 50, 60 are supported in a raised position. Ears 100 are folded into the down position. Forward and rear trailer wheels 112A, 112B are in contact with road surface 115 and trailer chassis locking pin 116 prevents trailer chassis 114 from rotating.

Figure 5:
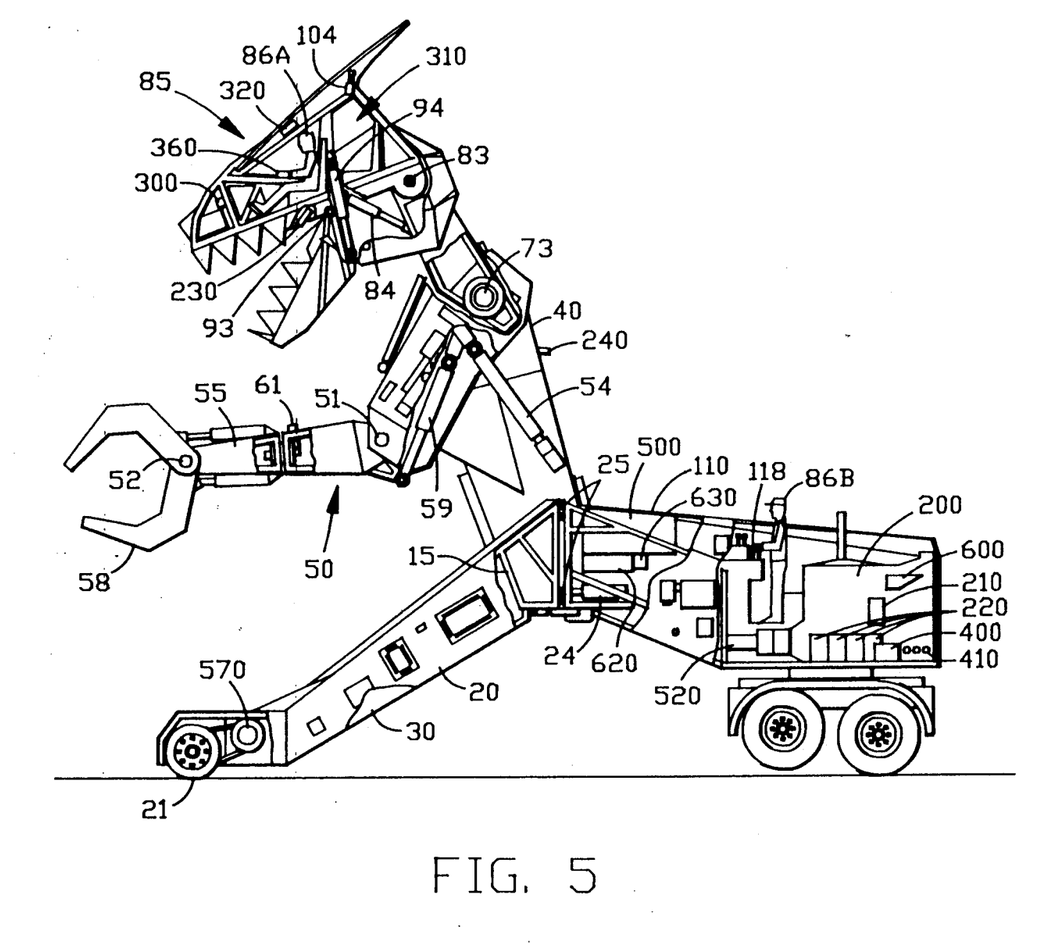
FIG. 5 is a side view of the invention, partly in cutaway, showing certain construction features.

With reference to FIG. 5, there is shown interior details of construction of robot 10 including ear, jaw, head, arm, elbow and leg cylinders 104, 94, 84, 54, 59, 24 respectively with their associated attachment points; and head, jaw, neck and arm, elbow, and claw pivot pins 83, 93, 73, 51, 52 respectively. Details of the attachment of legs 20, 30 via leg hinges 25 are shown. Cockpit operator 86A is shown inside cockpit 85 and the locations of cockpit lighting and air conditioning equipment 310, engine tachometer and speed control equipment 320, cockpit motion and drive control actuators 360, propane burner igniters 300, and forward looking video camera and transmitter 230 are shown. Rearward looking video camera and monitor 240 is shown attached to body 40. Tail operator 86B is shown standing at auxiliary controls 118 within tail 110 which is cutaway to show the locations of diesel engine 200, alternator 210, auxiliary power outlets 410, electric generator 400, storage batteries 220, air compressor 600, hose reel 630, hydraulic fluid reservoir 500 and compressed air storage tank 620. Locations of open loop pumps 520 and drive pumps 570 are shown.

Figure 6:
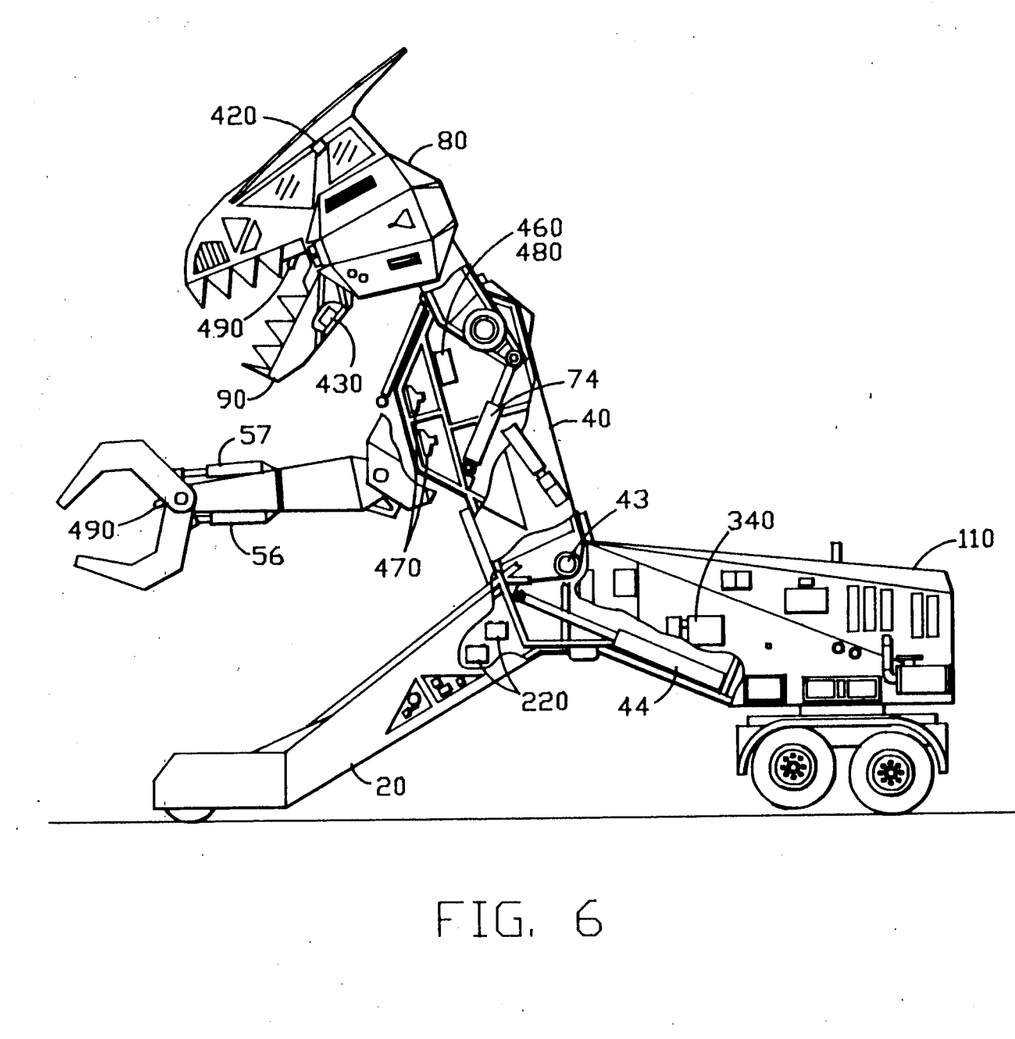
FIG. 6 is a side view of the invention with skin cutaway showing additional construction features.

With reference to FIG. 6, there is shown additional interior details of construction including neck, body and upper and lower claw cylinders 74, 44, 57, 56 respectively with their respective attachment points, and body pivot pin 43. Flood lights 420 are mounted on head 40, smoke generator 430 is mounted within jaw 90, audio microphones 490 are mounted on head 40 and claws 58, 68; audio speakers 470, audio amplifier 460 and media sources 480 are mounted within body 40, storage batteries 440 are mounted within left leg 20, and motion and drive signal processors 340 is mounted on the outside of tail 110.

Figures 7A, 7B:
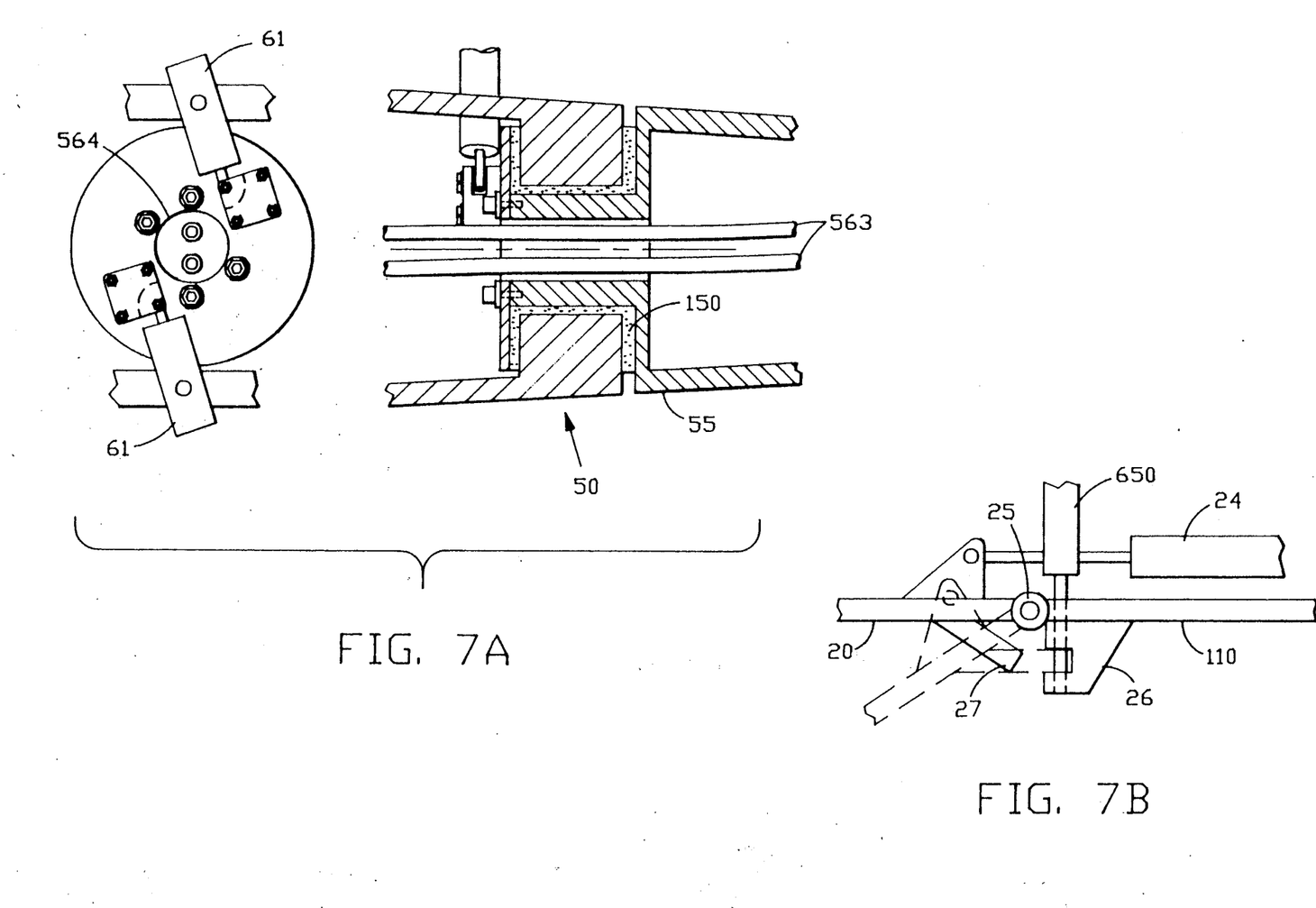
FIG. 7A is a partial view of a wrist rotation operating mechanism of the invention.
FIG. 7B is a mechanical schematic of a leg locking mechanism of the invention.

With reference to FIG. 7A and 7B there is shown details of wrists 55, 65 and legs 20, 30 construction and actuation. FIG. 7A shows wrist cylinders 61 and attachment of forearm and wrist 55 supported by bearing sleeve 150, a teflon impregnated sheeting. Hydraulic lines 563 for claw cylinders 66, 67 are routed through access holes 564. FIG. 7B shows attachment of leg 20 or 30 to tail 110 via leg hinges 25. Leg 20, 30 is pivotally attached to leg cylinders 24. In the operating mode locking pin 27 of leg 20, 30 is locked in support 26 whereby leg lock release cylinder 650 meshes with locking pin 27.

Figure 8:
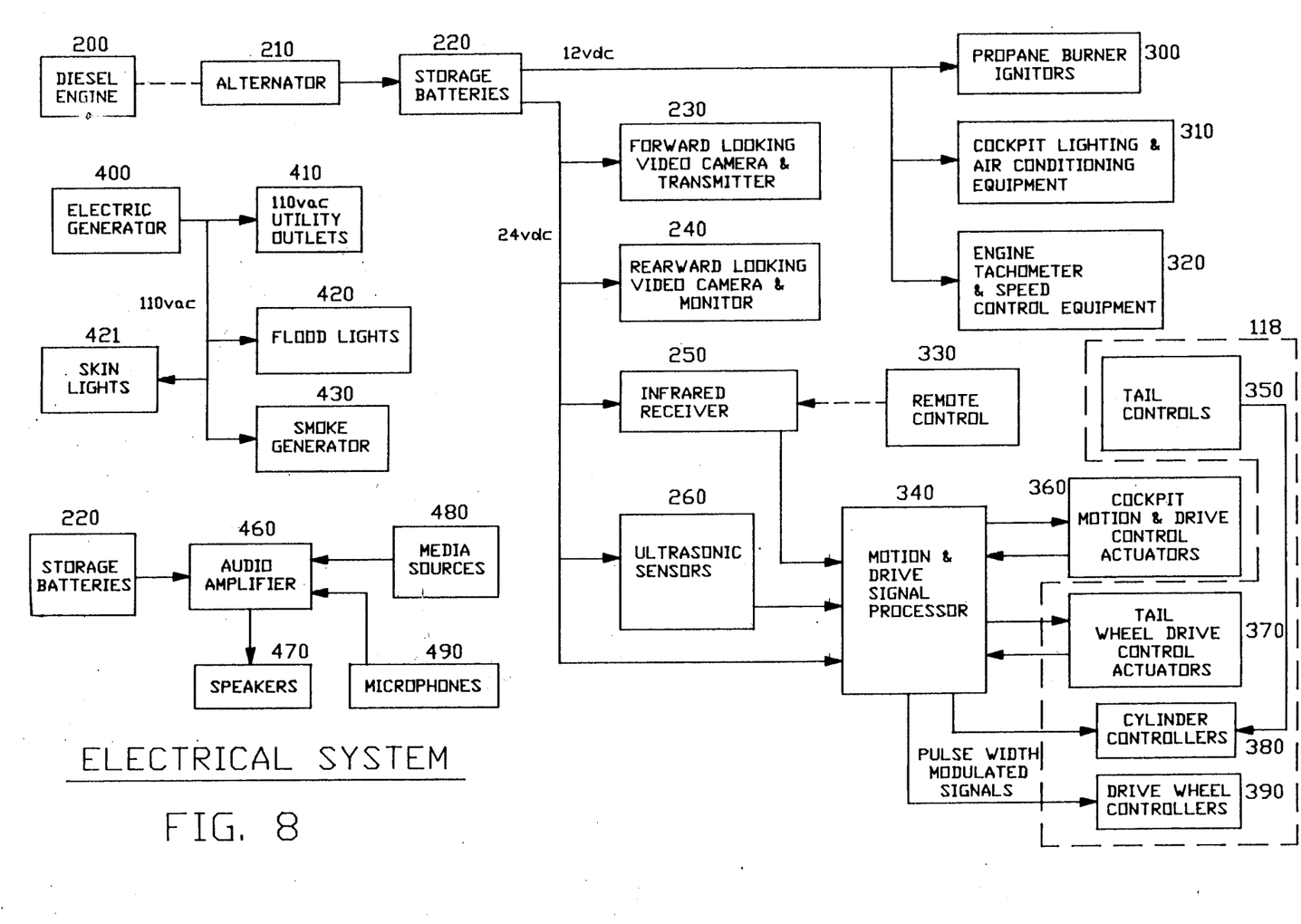
FIG. 8 is an electrical system diagram of the invention.

With reference to FIG. 8, electrical system diagram, there is shown the interconnections for the major electrical devices used in the operation of robot 10. Diesel engine 200 is mechanically interconnected with alternator 210 which is, in turn, electrically connected to storage batteries 220 which is wired to forward looking video camera and transmitter 230, to rearward looking video camera and monitor 240, to infrared receiver 250, to ultrasonic sensors 260, to motion & drive signals processor 340, to propane burner ignitors 300, to cockpit lighting and air conditioning equipment 310, and to engine tachometer and speed control equipment 320. Motion and drive signals processor 340 is electrically interconnected with infrared receiver 250, ultrasonic sensors 260 and cockpit and tail motion and drive control actuators 360, 370 and cylinder and drive wheel controllers 380, 390. Remote control 330 is connected via wireless infrared communication with infrared receiver 250. Tail controls 350 are wired to cylinder controllers 380. Electric generator 400 is electrically interconnected with utility outlets 410, to flood lights 420, and to smoke generator 430. Storage batteries 220 are connected to audio amplifier 460 which is interconnected with media sources 480, microphones 490 and speakers 470.

Figure 9:
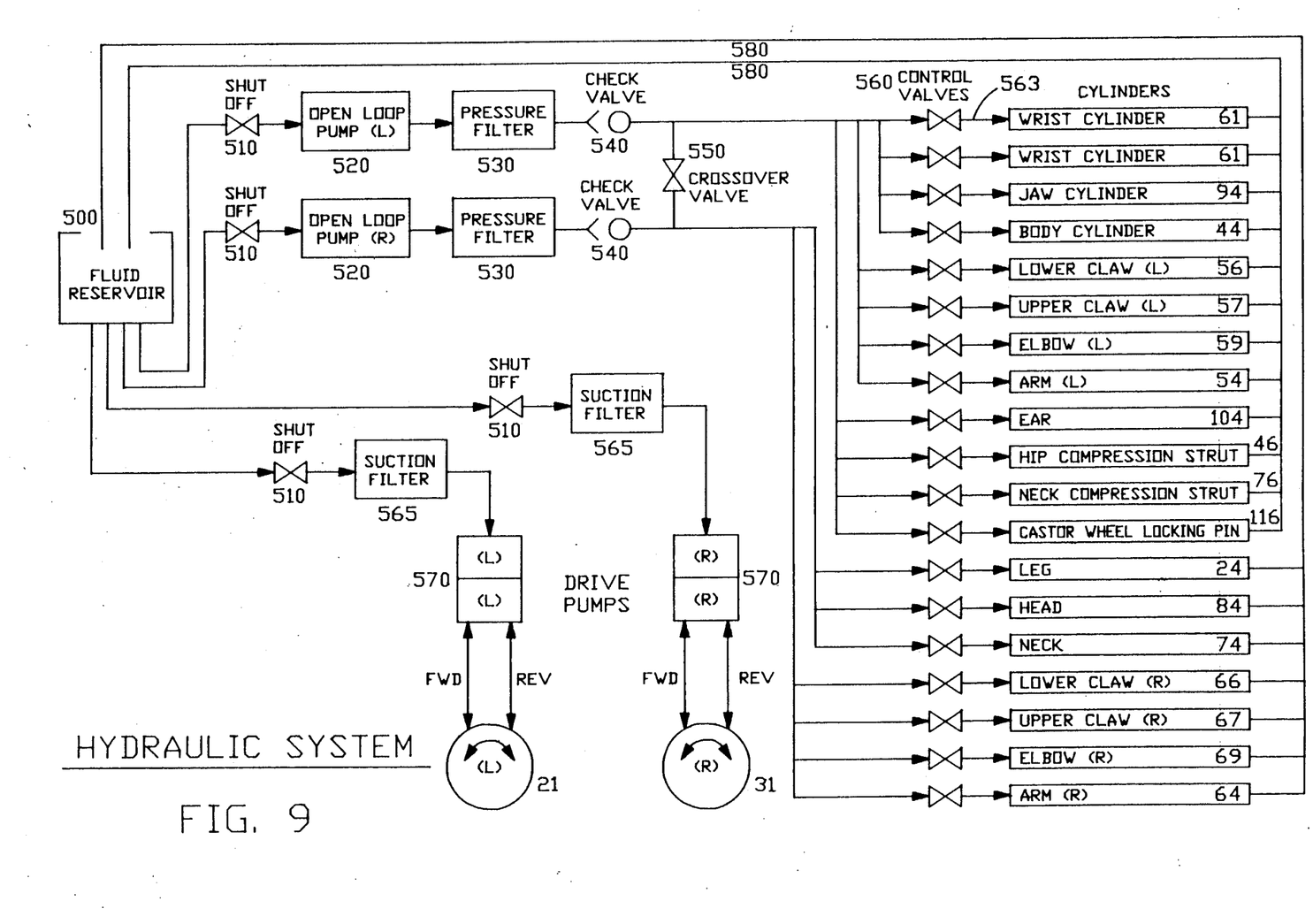
FIG. 9 is a hydraulic system diagram of the invention.

With reference to FIG. 9, hydraulic system diagram, there is shown the interconnections for the major hydraulic circuit devices. Fluid reservoir 500 is interconnected with open loop pumps 520 and thereby to hydraulic cylinders: 61, 94, 44, 56, 57, 59, 54, 104, 46, 76, 116, 24, 84, 74, 66, 67, 69, and 64 which are manifolded back to reservoir 500 via return lines 580. Drive wheels 21, 31 for legs 20, 30 are rotatably connected to hydraulic drive pumps 570.

Figure 10:
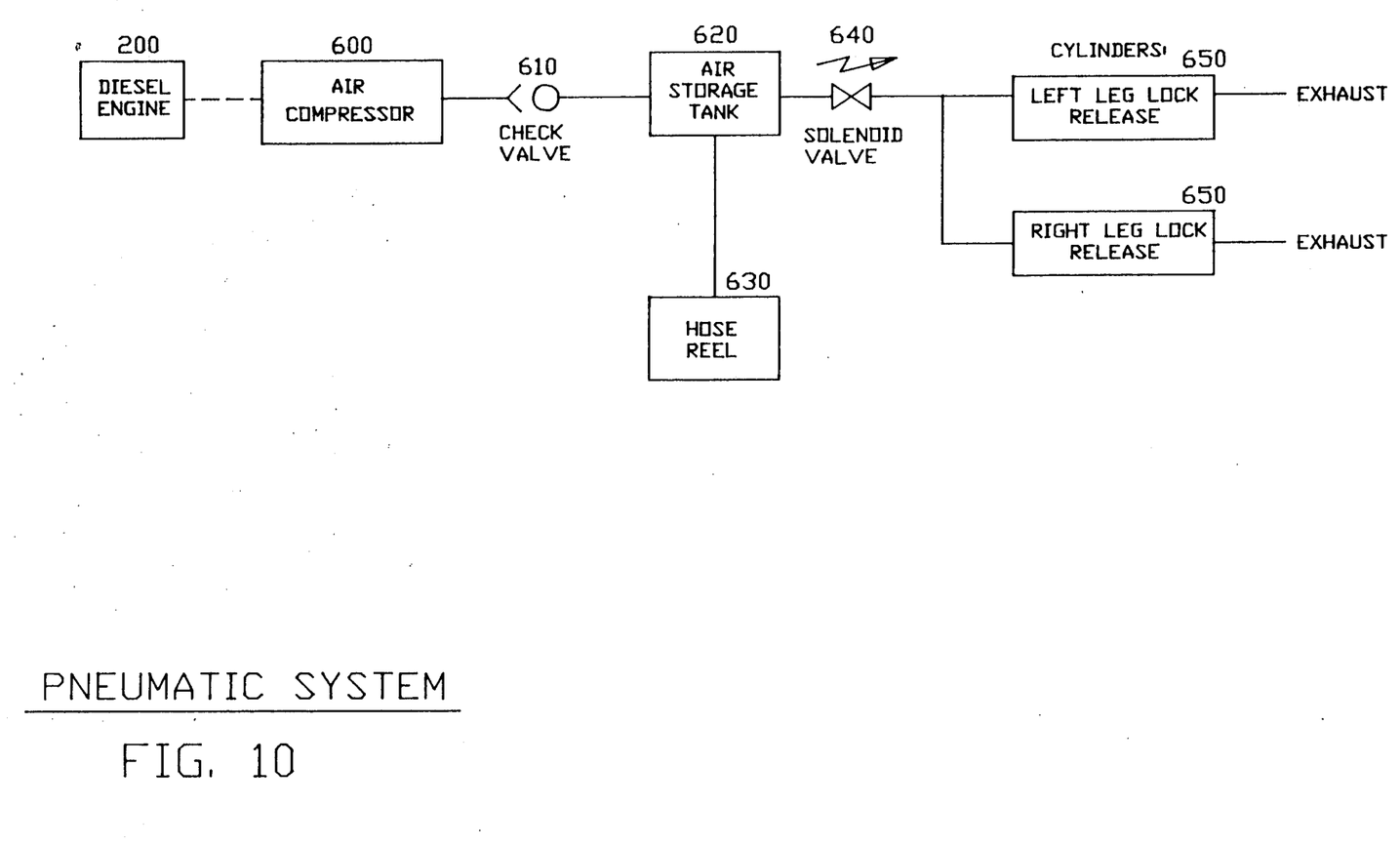
FIG. 10 is a pneumatic system diagram of the invention.

With reference to FIG. 10, pneumatic system diagram, there is shown the interconnections for the major pneumatic circuit devices including air compressor 600 driven by diesel engine 200, storage tank 620 which is interconnected with hose reel 630 and leg lock release air cylinders 650.

Figure 11:
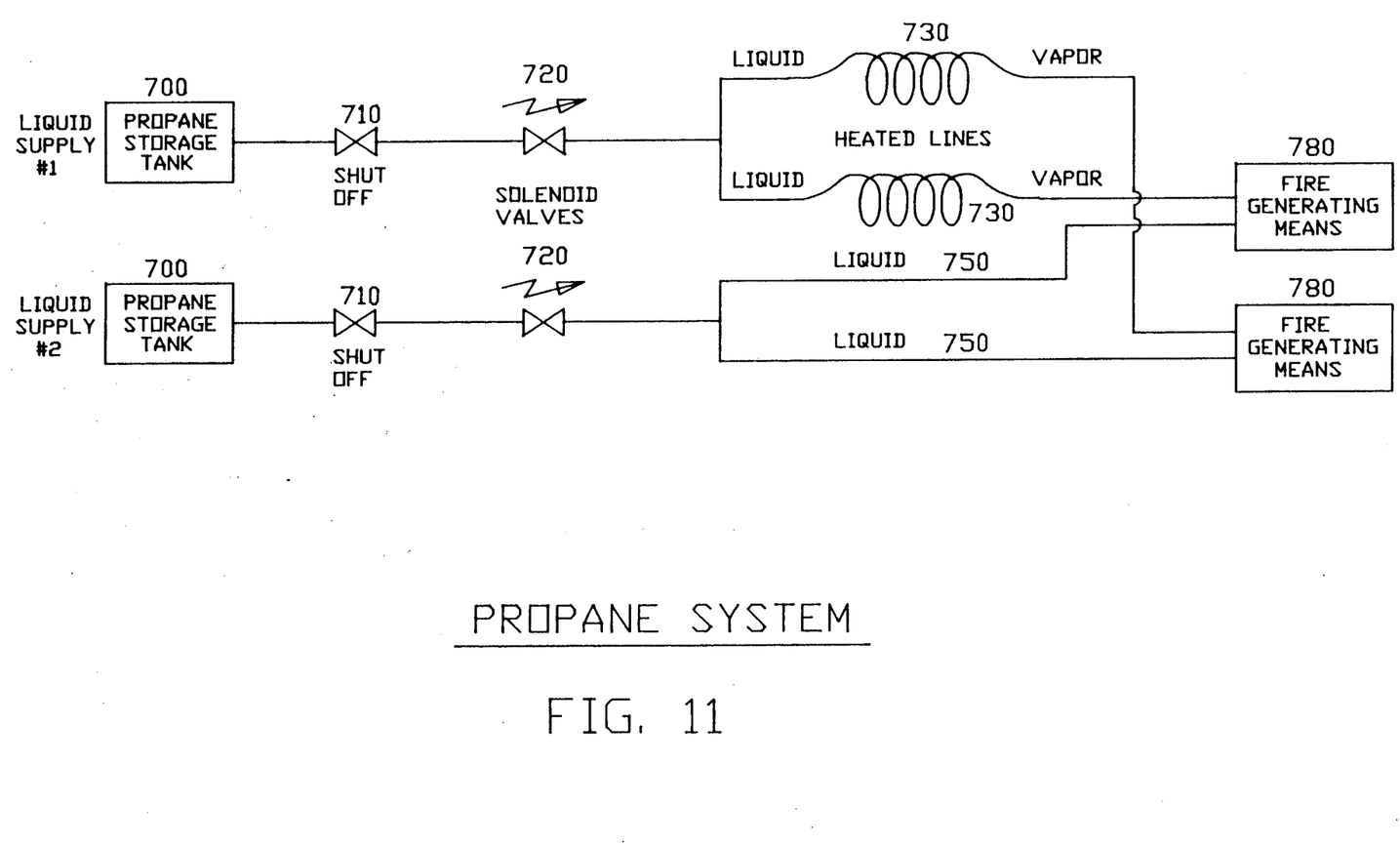
FIG. 11 is the propane system diagram of the invention.

With reference to FIG. 11, propane system diagram, there is shown the interconnections for the major propane circuit devices including propane storage tanks 700, shut off valves 710, electrically actuated solenoid valves 720, heated lines 730 and transfer lines 750 which supply flame generating means 780.

OPERATION OF THE INVENTION

With reference to FIG. 1, FIG. 2 and FIG. 3, there is shown robot 10 in operating mode with head 80 and body 40 erect, arms 50, 60 positioned to the front, jaw 90 opened, and ears 100 unfolded into the upward orientation. Legs 20, 30 are spread apart and locked into place. Forward trailer wheels 112A of trailer chassis 114 are lifted and held off road surface 115 by deflated air bag suspension 117. Rear trailer wheels 112B cooperate with trailer chassis 114 to act as a caster to tail 110. Drive wheels 21, 31 are independently powered by wheel drive pumps 570 thereby providing forward propulsion and maneuvering. Arms 50, 60 can be moved from ground level to above head 80. Wrist and forearm 55, 65 can assume any angular position with respect to the upper arm 53, 63 from straight out to approximately 90 degrees. Body 40, neck 70 and head 80 are fully articulated thereby giving robot 10 the appearance of lifelike movements; head 80, for instance, can be oriented straight upward (for baying at the moon) or ears 100 can be moved or flapped to render an additional appearance of lifelike mobility. Claws 58, 68 can be rotated approximately 180 degrees at the wrist, each claw half being independently movable providing a very wide range of dexterity. Claws 58, 68 are powerful enough to crush a full sized automobile and it is the intention of the spectacle for which robot 10 is designed that automobiles are grasped within claws 58, 68, lifted to approximately chest level and then crushed and bitten using claws 58, 68 and jaw 90. In addition to crushing and biting automobile 160 as shown in FIG. 2, fire 130 and smoke 140 are emitted from flame generating means 780 and smoke generator 430 respectively to increase the visual impact of the spectacle.

Operation of robot 10 is accomplished by cockpit operator 86A or tail operator 86B as shown in FIG. 5. Remote operator 86C as shown in FIG. 3 has control of basic mobility functions of robot 10 from a remote location on the ground using remote control 330. Controls 330, 350 or 360 include motion and drive control actuators 360 providing independent movement control over both halves of each claw 58, 68 for up and down motion, head 80 and neck 70 up and down, jaw 90 open and close, ears 100 up or down, body 40 erect or stooped, left and right wrists 55, 65 rotate left or right, elbows and arms 50, 60 up and down whereby each part is infinitely positionable over the range of motion. Additionally, control is provided to set direction and rotation velocity of both drive wheel 21, 31 independently. On/Off and level control is provided within cockpit 86, for all special effects, including fire 130 from flame generating means 780, smoke 140 from smoke generator 430, spectator presentation viewing via forward camera 230, high intensity light beams from spot lights 420, preprogrammed low frequency sound effects such as an earthquake sound as well as actual sounds of metal crushing, etc. from microphones 490, projected from speakers 470; and finally, skin lights 421. Legs 20, 30 are locked in a wide stance by locking pin 27 held in support 26, FIG. 7B. Leg lock release cylinders 650 are actuated to release locking pins 27 in order to fold legs 20, 30 into a position adjacent to body 40 for trailering.

With reference to FIG. 4, there is shown robot 10 in trailering mode which is assumed from operating mode by inflating all air suspension bags for wheels 112A and 112B to equal pressure so that all wheels 112 are in contact with road surface 116. Trailer chassis 114 is locked into position using trailer chassis locking pin 116 so that it will function as a standard trailer carriage. Robot 10 is docked to tractor 120 by lowering neck 70, locking neck compression strut 77 in place, and then raising neck 70 until stopped by strut 77. Next, body 40 is lowered until jaw 90 engages fifth wheel 113 of tractor 120. With further lowering of body 40 relative to tail 110, legs 20, 30 are forced into a raised position to clear road surface 115 and compression strut 47 is lowered into place providing rigid support after body 40 is raised slightly which forces tail 110, body 40, neck 70 and head 80 into compression thereby assuming rigidity. During road travel robot 10 is supported at two points; first, pivotally, at the underside of jaw 90 locked into fifth wheel 113, and second, at the trailing end where tail 110 is supported and rolls upon wheels 112.

An important part of the operation of robot 10 for exhibition purposes is the manifestation of special effects. In addition to fire 130 and smoke 140, forward looking video camera and transmitter 230 allows the projection of the camera view, from within jaw 90, onto a stadium screen. High intensity flood lights 420 and miscellaneous skin lights 421 mounted upon robot 10 provide heightened nightime visual impact. Speaker system 470 broadcasts frightening sound effects.

Since arms 50, 60 are restrained to vertical movements and therefore can collide with erected ears 100, ultrasonic sensors 260 provide actuation signals when a collision is imminent allowing automatic retraction of ears 100 to provide clearance for arms 50, 60 as they move to overhead positions. Rearward looking camera and monitor 240 provide for operational safety by allowing cockpit operator 86A to see rearward.

I claim:

1. A trailerable robotic figure comprising a body and a tail mounted upon at least one pair of forward wheels and at least one pair of rear wheels, said body being hinged to said tail for movement of said body between an erect exhibition position and a lowered trailerable position wherein a portion of said body extends forwardly of said tail and includes attachment means for pivotal connection to a tractor for hauling said robotic figure over roads.

2. The robotic figure of claim 1 wherein said tail includes a pair of hinged support legs for movement between an inward mutually proximal position for trailering and a spread apart position for exhibition, said legs being supported upon said forward wheels.

3. The robotic figure of claim 1 wherein said body includes a head with jaw pivotally mounted thereon, said jaw having said attachment means mounted thereon.

4. The robotic figure of claim 3 wherein said body includes at least one arm for grasping and lifting heavy objects from ground level to said jaw, said arm being constructed for crushing said heavy objects.

5. The robotic figure of claim 3 whereby said jaw includes means for crushing said heavy object.

6. The robotic figure of claim 1 further comprising flame generating means.

7. The robotic figure of claim 1 further comprising a cockpit for a human operator and motion and drive control actuators for selecting animation movements of said robotic figure.

8. A trailerable robotic figure comprising a body and a tail mounted upon at least one pair of forward wheels and at least one pair of rear wheels, said body being hinged to said tail for movement of said body between an erect exhibition position and a lowered trailerable position wherein a portion of said body extends forwardly of said tail and includes attachment means to a tractor for hauling said robotic figure over roads, said tail further comprising a pair of hinged support legs for movement between an inward mutually proximal position for trailering and a spread apart position for exhibition, said legs being supported by said forward wheels, and a head with jaw pivotally mounted thereon, said jaw having said attachment means mounted thereon, and further comprising at least one arm for grasping and lifting heavy objects from ground level to said jaw, said arm and said jaw being constructed for crushing said heavy objects, said figure further comprising flame generating means for burning said heavy objects and for visual delight, and a cockpit for a human operator, said cockpit having drive and control actuators whereby said operator can select and control animation movements and special effects of said robotic figure.

9. The robotic figure of claim 8 wherein said forward wheels are individually driven for providing forward thrust and steering during exhibition and said rear wheels are unlockable for free pivot caster motion for improved mobility.

10. The robotic figure of claim 8 or claim 9 further comprising at least one compression strut which when inserted between said head and said body or between said body and said tail or both, provides rigidization of said figure for trailering and provides hunching of said figure thereby lifting said forward wheels off said road whereby said figure is trailerable on said rear wheels while being pulled by said head.

11. A robotic figure having the appearance and size of a dinosaur, comprising a body, a head having pivoted jaw and ears, a neck connecting said body with said head, two rotatable arms with articulated forearms, wrists and claws, a tail providing hinged support to said body, two legs hingibly attached to said tail supporting thereon drive wheels individually driven for providing forward thrust and steering during exhibition and at least one pair of rear wheels mounted as a caster to said tail for improved mobility, said body movable between an erect exhibition position and a lowered trailerable position wherein said head may be pivotally attached to a trailer tractor for hauling said robotic figure over roads while at least one compression strut which when inserted between said head and said body or between said body and said tail or both, provides rigidization of said figure for trailering and provides hunching of said figure thereby lifting said forward wheels off said road whereby said figure is trailerable on said rear wheels while said legs are moved to a new inward mutually proximal position for trailering from a former spread apart position for exhibition, said arms and said jaw being constructed for crushing a heavy objects, said figure further comprising flame and smoke generating means for burning said heavy objects and for visual effect, and a cockpit for a human operator, said cockpit having drive and control actuators whereby said operator can select animation movements and special effects of said robotic figure.

12. The robotic figure of claim 11 further comprising a separate remote control wherein said drive and control actuators may be operated from a remote location.

13. The robotic figure of claim 11 further comprising a video camera and transmitter whereby a camera image view from said head can be transmitted for remote projection.

14. The robotic figure of claim 11 further comprising flood lights mounted thereupon for simulating laser effects projected from said head.

15. The robotic figure of claim 11 further comprising skin lights mounted upon said body, head, arms and legs as visual effects.

16. The robotic figure of claim 11 further comprising microphones mounted to said arms and said head, further including speakers and an audio amplifier mounted within said body for broadcasting sounds of crushing.

17. The robotic figure of claim 11 wherein said flame generating means are supplied a mixture of liquid and gaseous propane as fuel for generating said flame, said gaseous propane being generated by passing said liquid propane over heated lines, said heat being generated by said flame.

18. The robotic figure of claim 11 wherein said drive wheels are driven from drive pumps developing hydraulic pressure from rotating force generated by an engine.

19. The robotic figure of claim 11 wherein said motion and crushing forces are derived from hydraulic cylinders developing hydraulic pressure from open loop pumps driven by an engine.

* * * * *